Patented July 27, 1937

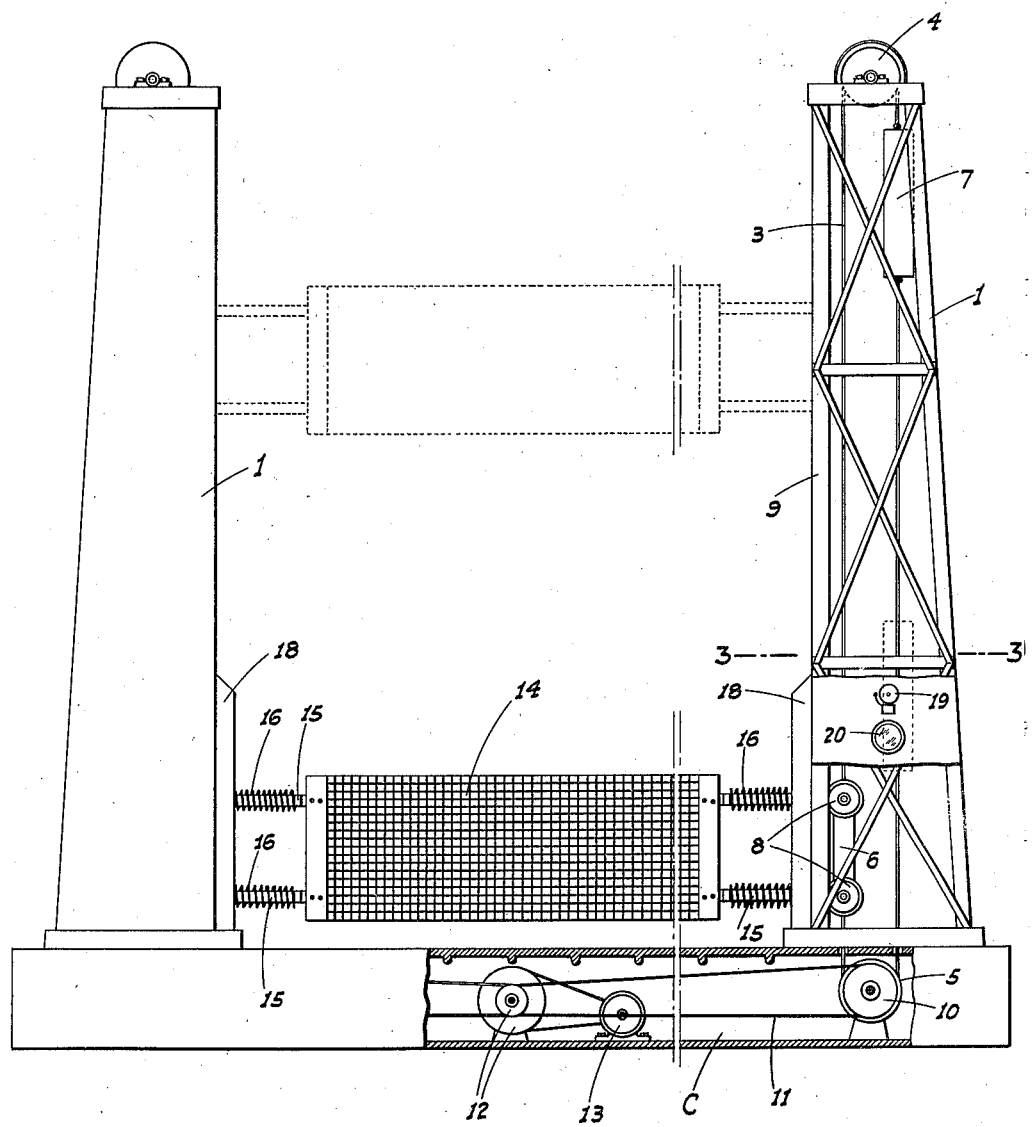

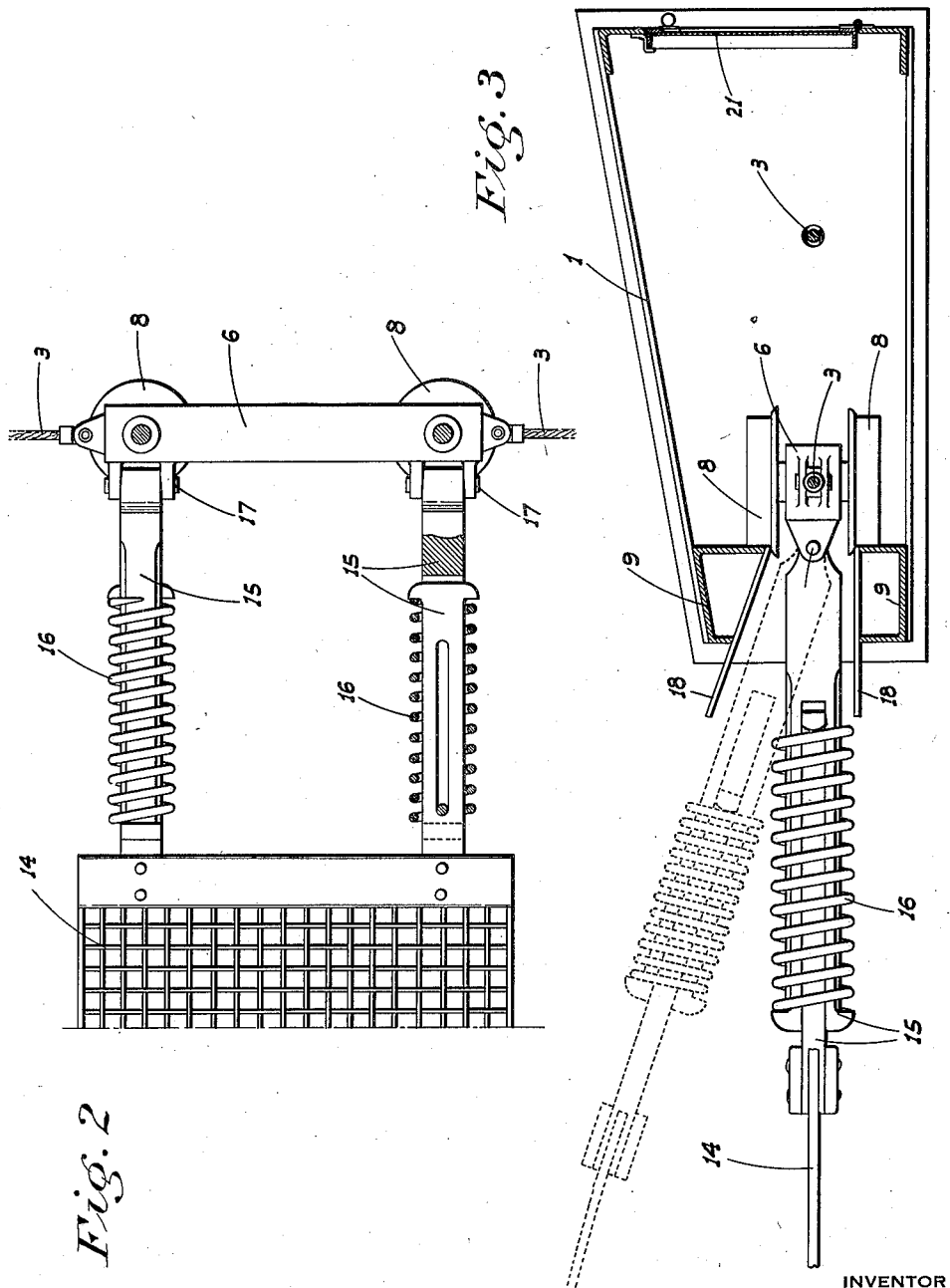

2,088,046

UNITED STATES PATENT OFFICE 2,088,046

CROSSING GATE

Benjamin F. White, Stockton, Calif., assignor of one-fifth to John H. Southwell, Stockton, Calif.

Application August 14, 1936, Serial No. 96,037

3 Claims. (Cl. 39—7)

This invention relates generally to a crossing gate and in particular is directed to a crossing gate for use at the intersection of motor vehicle roadways with railroad tracks.

With present crossing gates, they are often built of very light wood and even though the gate is closed, a motor vehicle can crash through the same without effective retardation.

It is therefore the principal object of my invention to provide a crossing gate which, when in lowered or road-closing position, will be practically crash proof and will effectively prevent a motor vehicle from breaking through the same and into the path of an approaching train.

Another object of my invention is to provide a crossing gate which will be sufficiently resilient so that when a motor vehicle strikes the same, the gate will not inflict serious damage to the vehicle, nor will the gate itself be damaged.

A further object of the invention is to provide a crossing gate in which the drive mechanism may be automatically actuated upon the approach of a train much in the same manner as a semaphore, or may be operated by a watchman stationed at the crossing.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the device and partly in section.

Figure 2 is an enlarged fragmentary view of a portion of the gate and the carriage mechanism to which it is secured.

Figure 3 is a transverse sectional view taken on line 3—3 of Fig. 1.

Referring now more particularly to the characters of reference on the drawings, the device comprises two towers, indicated at 1, erected at the sides of a roadway 2 adjacent a railroad crossing. Each tower and the gate supporting mechanism therein is substantially identical in construction and therefore a description of one will suffice for both.

Each tower is provided with an endless unit extending therethrough and comprising a cable 3 trained over a pulley 4 journaled in the top of the tower and a pulley 5 journaled in a compartment C formed across and beneath the roadbed 2 and beneath the towers. A carriage 6 is interposed in one reach of the cable while a counter-weight 7 is disposed in the other reach at the opposite end thereof.

The carriage 6 is provided with flanged wheels 8 which ride on spaced vertical rails 9 which also form a part of the tower structure.

The pulley 5, beneath each tower, is rotated by suitable means such as another pulley 10 journaled in common therewith and driven by a belt 11 from reduce speed pulleys 12, centrally disposed in compartment C. A motor 13 drives the reduce speed pulleys 12.

A gate 14, made of resilient and flexible metal netting extends between the towers and is secured at its ends to carriages 6 by means of extensible couplings 15, a vertically spaced pair being employed at each end to connect the gate to the adjacent carriage. These couplings are normally held in non-extended position by means of compression springs 16 which form a part of the couplings. Each coupling is also pivoted, as at 17, to the carriage for swinging movement in a horizontal plane.

Guard plates 18 are secured to and project outward from rails 9 adjacent the lower portion of the towers and are thus disposed so as to extend on both sides of the couplings and protect the pivotal connections of the coupling from injury. These guard plates also limit the horizontal swinging movement of the couplings. The rail which supports that guard plate which extends in a plane back of the gate is cut at an angle so that said plate may slope outward and away from the gate in order to permit the couplings to swing on their pivots when a motor vehicle strikes the gate.

One of the towers may also be provided with an audible signal 19 such as a bell or siren and a visible signal 20 both of which may be electrically actuated through a suitable circuit which will be closed upon lowering of the gate. A door 21 provides access into each tower.

Operation

In operation the gate is normally held suspended high in the air above the roadway, as shown in dotted lines in Fig. 1. Upon the approach of a train, the circuit for motor 13 is closed and subsequently broken either automatically by the train as in the same manner in which a semaphore is actuated, or by a watchman stationed at the tower.

Upon the actuation and rotation of motor 13, pulleys 5 are driven in a direction to cause carriages 6 to be lowered and counterweight 7 to be raised. With the lowering of the carriages, gate 14 is positioned across the roadway.

Motor 13 is reversible and, after the train has passed the crossing, the circuit is again made to actuate the motor in the reverse direction to raise the gate, and the circuit is then broken.

When in lowered position, the gate is practically crash proof for the reason that the gate itself is formed of resilient and flexible metal netting and is supported by the extensible couplings 15, the compression springs 16 of which oppose the extension of the couplings. Therefore when a vehicle strikes the gate, it will flex or give to a certain extent and will bring the vehicle to a stop with a minimum of damage thereto.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A crossing gate comprising a gate normally extending across a roadway some distance above the same, supporting means for the gate on each side of the road, extensible couplings extending from the ends of the gate and pivoted to the supporting means for pivotal movement in a horizontal plane, means to raise and lower the supporting means in a vertical plane, and fixed guard means enclosing the inner end portions of the couplings when the gate is lowered and arranged to limit the horizontal swinging movement of said couplings.

2. A device as in claim 1 in which said guard means comprises spaced vertical plates mounted on and projecting from the supporting means on each side of and spaced from said inner end portions of the couplings.

3. A device as in claim 1 in which said guard means comprises spaced vertical plates mounted on and projecting from the supporting means on each side of and spaced from said inner end portions of the couplings; one of said projecting plates flaring outwardly from the supporting means whereby to afford greater pivotal movement of the couplings in one direction.

BENJAMIN F. WHITE.